INVENTOR.
DANIEL M. KABAK
BY
ATTORNEYS

United States Patent Office 2,825,867
Patented Mar. 4, 1958

2,825,867

CIRCUIT MEANS INCLUDING BRIDGE FOR AUTOMATICALLY VARYING CURRENT THROUGH A LOAD

Daniel M. Kabak, Yonkers, N. Y.

Application March 25, 1957, Serial No. 648,156

2 Claims. (Cl. 323—66)

My invention relates to improved electrical circuit means for varying the flow of current through a load.

In particular, my invention relates to circuits and means for gradually reducing the current through a load from an initial steady value to a selected minimum value, and for varying the current through a load in a cyclic manner.

This application is a continuation in part of my prior U. S. application, Serial No. 342,500, for Circuit Means for Automatically Varying Current Through a Load, filed March 16, 1953, now U. S. Patent No. 2,786,968.

One important object of my invention is to provide a circuit which is a specific improvement over the circuit of Fig. 1 of said prior application.

Another important object of my invention is to provide a circuit which is a specific improvement over the circuit of Fig. 3 of my said prior application.

The two embodiments disclosed in my present application are further embodiments of the invention of said prior application.

Other objects and advantages of the invention will become apparent from the following description, in conjunction with the annexed drawings.

FIRST EMBODIMENT

Figure 1:
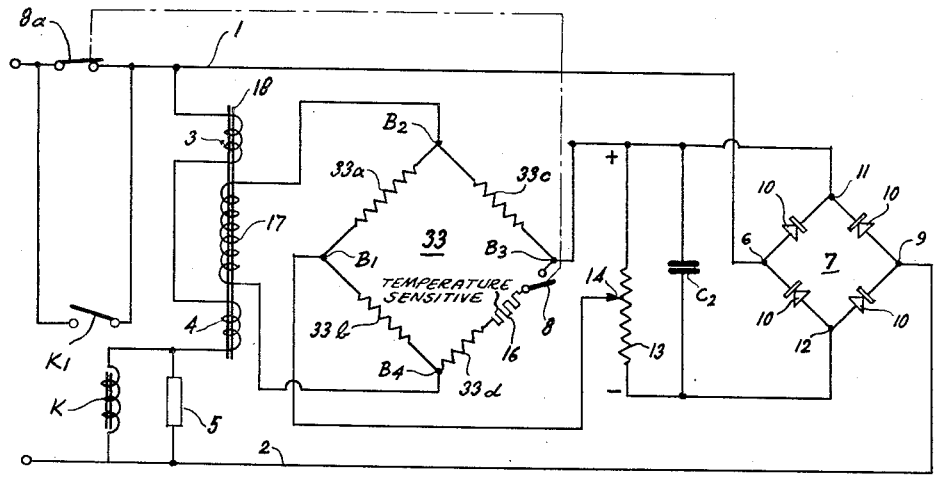
Fig. 1 is a schematic diagram of an electrical circuit in accordance with a first embodiment of my invention.

Fig. 1 shows lines 1 and 2, which are adapted to be connected through suitable fuses or the like (not shown) to a suitable source of alternating current (not shown). Line 1 connects through switch 8a to one side of the power source.

Fig. 1 also shows a saturable reactor which has a core 18, a direct current coil 17 and two reactance coils 3 and 4 being wound on said core 18. Said reactor is of the same type as is described in said prior application. Coils 3 and 4 are connected in series with load 5 between lines 1 and 2. Optionally, load 5 is primarily resistive, but the invention is not so limited.

Optionally, relay coil K is connected across load 5. The relay includes normally open contacts K connected across the contacts of switch 8a.

The source of power for direct current coil 17 is rectifier 7. This comprises four diodes 10 which are connected together in a conventional bridge circuit having input terminals 6 and 9 and output terminals 11 and 12. Line 1 is connected to terminal 6, and line 2 is connected to terminal 9, whereby an alternating voltage is impressed upon said input terminals 6 and 9. Diodes 10 respectively pass current unidirectionally in such a manner that output terminal 11 is positive, and output terminal 12 is negative. Rectifier 10 thereby serves as a source of direct current at said output terminals 11 and 12.

A resistor voltage divider 13 is connected across the rectifier output terminals 11 and 12, the resulting polarity of said voltage divider 13 being indicated by the plus and minus signs of Fig. 1. Optionally, a filter condenser C2 is also connected across the terminals 11 and 12. The positive terminal of voltage divider 13 and adjustable tap 14 thereof are connected through a bridge circuit across coil 17 so as to pass a direct current therethrough.

The bridge 33 includes resistors 33a and 33c connected together at terminal B2, resistor 33b connected to resistor 33a at terminal B1 and resistor 33d connected to resistor 33b at terminal B4. The end of resistor 33c opposite terminal B2 is designated as terminal B3. Resistor 33d, temperature-sensitive resistor 16 and switch 8 are connected in series between terminals B3 and B4. Terminal B3 is connected to the plus terminal of resistor 13. Terminal B1 is connected to tap 14. Accordingly, terminals B1 and B3 are the input terminals of bridge 33. Terminals B2 and B4 are the output terminals of bridge 33 and are connected to the respective ends of coil 17.

Temperature-sensitive resistor 16 is of the type described in my aforesaid prior U. S. patent application. For example, resistor 16 may have a negative temperature coefficient of resistance, meaning that its resistance drops as it is heated.

While for convenience switches 8 and 8a are shown independently, actually they are either ganged or are separate poles of a common switch. From the standpoint of the circuit switch 8 and 8a operate in unison by manual means. When switch 8 is open, as shown in Fig. 1, switch 8a is closed. When switch 8 is closed, switch 8a is open.

It will be understood that optionally switch 8 may be operable by a timing mechanism or by any other suitable means.

*Operation of first embodiment*

It will be assumed that switch 8 is initially open and that resistor 16 is initially at ambient temperature. Accordingly, bridge 33 is unbalanced and maximum direct voltage is supplied to coil 17, resulting in an initial maximum magnetic field in core 18 and initial minimum value of reactance of coils 3 and 4. Accordingly, under the initial conditions, the current through load 5 has an initial selected value. As the result of the maximum load current, relay coil K is energized sufficiently to close contacts K1.

When switch 8 is closed, the initial resistance of resistor 16 is high and there is substantially no change in the load current. Accordingly, contacts K1 remain closed, and current flows through the device even though switch 8 is open.

With the passage of some current through resistor 16, it is gradually heated above ambient temperature, and its resistance gradually drops from its initial value. Bridge 33 moves toward balance, and the current through coil 17 gradually drops. As a result, the current through load 5 decays. The resistance of resistor 16 may drop to a selected terminal value whereby the current through load 5 decays to a selected terminal value. Optionally, when such selected terminal value of a load current is reached, the current through relay coil K is sufficiently low so that contacts K1 open, thereby cutting off the power to the device. This permits cooling of resistor 16 so that it will become ready for another sequence of operation.

Reference is made to my aforesaid prior U. S. application to indicate some of the uses of the circuit of Fig. 1, and to indicate some of the desired characteristics of resistor 16.

It will be apparent that the primary difference between the first embodiment of this application and the circuit of Fig. 1 of my aforesaid prior U. S. application is the addition of bridge 33. Bridge 33 makes it possible to produce the desired range of variation in load current as the result of a considerably smaller range of variation of resistance of resistor 16. In other words, as the result of the provision of bridge 33, resistor 16 does not have to be "driven" over as great a range of temperature variation and resistance variation to produce the desired change in load current.

*Example*

In a working model of the invention, resistance 33a had a value of 1000 ohms. Resistance 33b had a value of 250 ohms. Resistance 33c had a value of 1200 ohms. Resistance 33d had a value of zero ohms. Resistor 16 was a "type F" resistor of the type described in Bulletin GR-3 of the Globar Division of The Carborundum Company, Niagara Falls, New York. The resistor had a negative temperature coefficient of resistance. At 25° C., with no voltage applied across resistor 16, it had a resistance of 9000 volts.

In said working model, tap 14 was adjusted to apply a voltage of 100 volts across the input of the bridge. The resulting voltage drop across resistor 16 was approximately 87 volts, when switch 8 was closed. At this voltage the current through resistor 16 heated it sufficiently so that its resistance began to drop. The voltage drop across resistor 16 was reduced to 67 volts, with the resistance of resistor 16 then reaching a terminal value of approximately 600 ohms. At this voltage drop and at this resistance value, the condition of equilibrium was reached whereby the voltage drop across resistor 16 and the resistance thereof remained substantially constant.

When switch 8 was first closed, the output voltage of the bridge applied across coil 17 was approximately 12 volts. Coil 17 had a resistance of approximately 300 ohms, so that the initial current in coil 17, corresponding to closing of switch 8, was approximately 40 milliamperes. With the particular saturable reactor used in the working model, saturation of the core was thereby produced and maximum load current was obtained.

When resistor 16 reached the terminal value of approximately 600 ohms, the output voltage of the bridge reached a terminal value of approximately 3 volts, which voltage was sufficiently low so as to produce substantially minimum flux in the core of the saturable reactor, and thereby lower the load current to a minimum value.

From the foregoing, it will be apparent that with the use of the bridge, a voltage drop of less than 25% across resistor 16 resulted in a 75% drop in voltage applied across coil 17. Accordingly, greatly increased control of the variation in load current was made possible by use of the bridge.

While the "thermistor" described in "Thermistors as Components Open Product Design Horizons," by K. P. Dowell (Electrical Manufacturing, August, 1948), has a greater negative temperature coefficient of resistance than the "type F" resistor, the "type F" resistor has a slower time response, which is important when a gradual change in load current is desired. Accordingly, I prefer to use the "type F" resistor, and this makes the use of the bridge circuit of Fig. 1 extremely important.

SECOND EMBODIMENT

Lines 1 and 2, reactance coils 3 and 4, direct current coil 17, load 5, rectifier 7, voltage divider 13 and condenser C2 correspond to the corresponding numbered elements of Fig. 1 and are connected in circuit in the same manner (except for coil 17).

The adjustable tap of divider 13 is designated by the reference numeral 20 instead of by reference numeral 14. The bridge 60 is similar to bridge 33 of the first embodiment, and includes the same resistors 33a, 33b, 33c and 33d, the same terminals B1, B2, B3 and B4, and the same type of temperature-sensitive resistor 16. However, instead of the switch 8 connected in series with resistor 33d and temperature-sensitive resistor 16, between terminals B3 and B4, the normally open contacts 38b of a relay coil 38 are substituted in circuit for said switch 8. Also, coil 17 is not connected directly across the bridge output terminals B2 and B4 as is the case in the first embodiment. In addition, the circuit of Fig. 2 includes certain elements not present in the circuit of Fig. 1. In particular, a thermo-type time delay relay is connected across load 5. This comprises the heater coil 34 connected in series with the optional resistance R2 across load 5.

Said thermo-type relay also comprises bi-metal strip 35 connected to line 2 and adapted to be heated by the heat emitted by coil 34. Said strip 35 carries a contact 36. Line 1 is connected through relay coil 38 of a magnetic relay solenoid and the normally open contacts 37 and 36 and strip 35 to said line 2. Therefore, coil 38 is energized when contacts 36 and 37 are closed. Condenser C1 is connected across coil 38.

Relay coil 38 controls four sets of relay contacts, the normally open sets of contacts 38a and 38b and the normally closed sets of contacts 38c and 38d. As previously pointed out, the open set of relay contacts 38 are connected in series with resistor 38d and temperature-sensitive resistor 16 between bridge terminals B3 and B4. Contacts 38c are connected between terminals B2 and B3. Contacts 38d are connected across terminals B1 and B4.

Coil 17, a further temperature-sensitive resistor 21 and an optional resistor R1 are connected in series between the output terminals B2 and B4 of bridge 60. The aforesaid relay contacts 38a are connected across temperature-sensitive resistor 21 and resistor R1 in the manner shown in Fig. 2.

Resistor 21 is similar to resistor 16. In this embodiment, both of these elements have a negative temperature coefficient of resistance. In this embodiment, the current through load 5 is varied cyclically.

*Operation of second embodiment*

Figure 2:
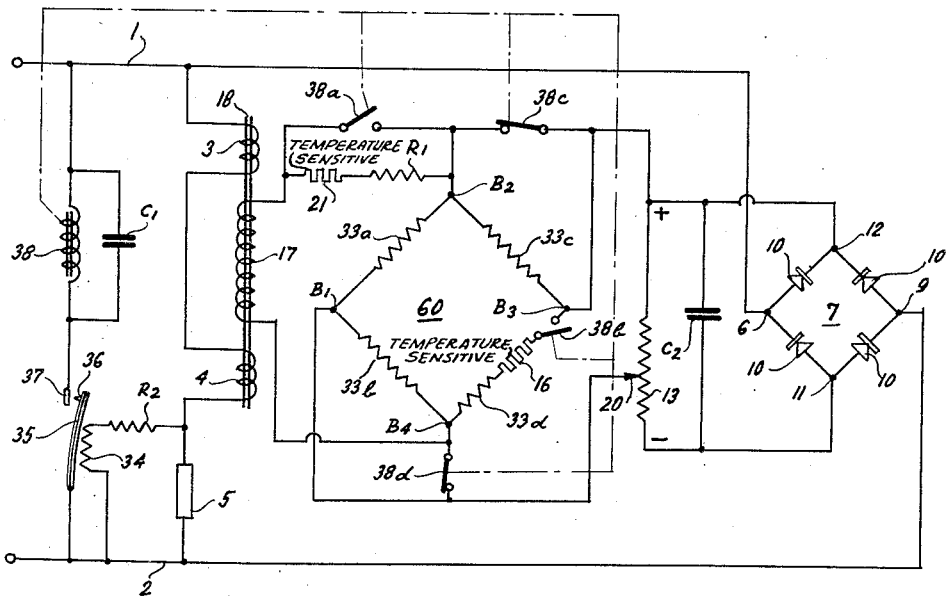
Fig. 2 is a schematic diagram of an electrical circuit in accordance with a second embodiment of my invention.

In describing the operation of the circuit of Fig. 2, it will be assumed that contacts 36 and 37 are initially open, and that resistor 21 is initially at ambient temperature. The circuit is then similar to the circuit of Fig. 2 of my aforesaid U. S. patent application (with the operating switch of said Fig. 2 of said prior application closed), with the addition of the resistance bridge 60 in the circuit.

The resistance of resistor 16 is at its initial maximum value. Bridge 60 is unbalanced, but in view of the high initial resistance of resistor 21, the current through coil 17 is at its initial selected relatively low value, and the current through load 5 is at an initial selected relatively low value.

As a result of the passage of current through the temperature-sensitive resistor 21 and the heating thereof, the current in coil 17 and the current through load 5 rise substantially as described in connection with the current of Fig. 2 of said prior U. S. patent application.

As the current through load 5 rises, the voltage drop across load 5 rises and the current through heater coil 34 rises. After a suitable time delay, and after the current through load 5 has reached a selected maximum value, bi-metal strip 35 is sufficiently heated by the heat emitted by coil 34 to close contacts 36 and 37. As the result of the closing of contacts 36 and 37, relay coil 38 is energized, and contacts 38c and 38d are opened. Also, contacts 38a and 38b are closed. The circuit then corresponds to that of the first embodiment (switch 8 being closed).

It is noted that at this point of the cycle resistor 16 is at ambient temperature. While resistor 16 is in circuit, resistor 21, which is shorted out by the relay coil contacts, cools to ambient temperature. The cooling rate of resistor 16 is faster than its heating rate while in circuit. It will be apparent that the closing of relay contacts 38b corresponds to the closing of switch 8 in the first embodiment.

With relay contacts 38c and 38d opened, resistors 38b and 38c are no longer shorted. Shorting of these resistors during the first half of the cycle serves the purpose of effectively shorting out the bridge and of connecting the high resistance 33a across coil 17 and in parallel with resistor 23 and resistance R1. This is necessary for proper operation of the circuit as is the case in Fig. 2 of my said prior U. S. application.

The operation of the circuit of Fig. 2 is now similar to that of Fig. 1 (with switch 8 closed). Bridge 60 is unbalanced as the result of the high resistance of resistor 16, so that the bridge has maximum output voltage, the load current thereby remaining at substantially the high point reached during the first part of the cycle. When resistor 16 is heated, as the result of the passing of current therethrough, the current in coil 17 drops and the current through load 5 drops, substantially as in the case of the circuit of Fig. 1. As a result, the current through heater coil 34 drops, and bi-metal 35 cools. After a suitable time delay, and after the circuit through load 5 has reached a selected minimum value, strip 35 cools sufficiently so that contacts 36 and 37 open, and the switch relay contacts return to their initial positions. During the short time interval in which all of the switch contacts controlled by relay coil 38 are opened, resistance 33a serves as a protecting high resistance across coil 17. While resistor 21 is in circuit, resistor 16 cools to ambient temperature. The cooling rate of resistor 16 is greater than its heating rate when in circuit.

It will be apparent that the circuit of Fig. 2 makes it possible to vary the current through load 5 in a cyclic manner, entirely similarly to the operation of the circuit of Fig. 3 of my aforesaid U. S. patent application. The chief difference is that when resistor 16 is in circuit, it operates by means of bridge 60 for better current control.

A detailed working example of the circuit of Fig. 2 is not given, since the values of the bridge resistances and of resistor 16 may be substantially the same as in the first embodiment. The values of the additional circuit components of Fig. 2 are either conventional or may be readily calculated empirically.

While I have disclosed preferred embodiments of my invention, and have indicated various changes, omissions and additions which may be made therein, it will be apparent that various other changes, omissions and additions may be made in the invention without departing from the scope and spirit thereof.

I claim:

1. A device for varying the flow of current from an alternating voltage source through a load, said device comprising an electric current amplifier whose output is adapted to be connected in circuit with said voltage source and said load for controlling the current flow through said load, a further voltage source which is effective to supply a selected voltage during a selected time interval, and circuit means including a variable resistor at selected initial temperature for coupling said further voltage source to the input of said current amplifier, said resistor being adapted to be heated above said selected initial temperature by the passage of current therethrough from said further voltage source and having a negative temperature coefficient of resistance, said circuit means comprising a resistance bridge having four resistance arms connected in series and having four terminals, one of said resistance arms also including said variable resistor and switch means, two opposed input terminals of said bridge being connected across said further voltage source, the remaining terminals of said bridge being connected across said input of said electric current amplifier, the resistance of said variable resistor being initially sufficiently great to unbalance said bridge upon closing of the switch means to supply maximum initial current to the input of the current amplifier, the reduction of resistance of said variable resistor being adapted to tend to balance the bridge, the output current of said current amplifier varying substantially continuously during said selected interval and reaching a selected terminal value at the conclusion of said selected time interval.

2. An electrical device comprising a saturable reactor having a reactance coil and a direct current coil, said reactance coil being adapted to be connected in series with a load across a source of alternating voltage, a source of direct voltage, first and second resistors each having a negative temperature coefficient of resistance, relay means adapted to be controlled by the load current and including first and second sets of normally closed relay contacts and third and fourth sets of normally open relay contacts, a resistance bridge having input terminals and output terminals, a first resistance arm connected between a first input terminal and a first output terminal, a second resistance arm connected between said first output terminal and the second input terminal, a third resistance arm connected between said first input terminal and the second output terminal, and a fourth resistance arm including said first resistor and said third set of relay contacts connected between the second output terminal and the second input terminal, said direct voltage source being connected across said input terminals, said first and second sets of contacts being respectively connected across said second and third resistance arms, one end of said direct current coil being connected to one of said output terminals, said second resistor and said fourth set of relay contacts being connected in parallel with each other and between the other end of said direct current coil and the other output terminal, said relay means being adapted to open said normally closed switch contacts and close said normally open switch contacts when the load voltage drop reaches a selected maximum value, said first resistor when initially in circuit having sufficiently high resistance to unbalance the bridge to supply maximum initial current to the direct current coil with resulting substantial maximum load voltage drop, the reduction of resistance of said first resistor being adapted to tend to balance the bridge for reduction of load voltage drop, said relay means being adapted to close said normally closed switch contacts and open said normally open switch contacts when the load voltage drop reaches a selected minimum value, said second resistor when in circuit having sufficiently high resistance to supply minimum initial current to the direct voltage coil with resulting substantial minimum load voltage drop, the reduction of resistance of said second resistor being effective to return the load voltage drop to its selected maximum value.

No references cited.